United States Patent [19]

Gago

[11] Patent Number: 4,470,839

[45] Date of Patent: * Sep. 11, 1984

[54] SOLID PARTICLES CONTAINING METAL PEROXIDES, THEIR PREPARATION AND THEIR USE FOR THE AMENDMENT OF SOILS

[75] Inventor: Ignace Gago, Braine-l'Alleud, Belgium

[73] Assignee: INTEROX (Société Anonyme), Brussels, Belgium

[*] Notice: The portion of the term of this patent subsequent to Oct. 6, 1998 has been disclaimed.

[21] Appl. No.: 372,385

[22] Filed: Apr. 27, 1982

[30] Foreign Application Priority Data

Apr. 27, 1981 [FR]  France .................................. 81 08512

[51] Int. Cl.$^3$ .................. C05B 7/00; C05B 17/00; B05D 7/00
[52] U.S. Cl. ............................................ 71/34; 71/53; 71/903; 427/213; 427/215; 428/403
[58] Field of Search ................ 210/759; 427/215, 213, 427/220; 428/403, 404, 407; 252/99; 71/34–36, 53, 903

[56] References Cited

U.S. PATENT DOCUMENTS

| | | | |
|---|---|---|---|
| 4,135,010 | 1/1979 | Klebe et al. | 427/215 |
| 4,293,426 | 10/1981 | Gago | 210/759 |
| 4,321,301 | 3/1982 | Brichard et al. | 428/403 |

FOREIGN PATENT DOCUMENTS

| | | |
|---|---|---|
| B0002543 | 10/1981 | European Pat. Off. . |
| 2376695 | 8/1978 | France . |
| 2383880 | 10/1978 | France . |

OTHER PUBLICATIONS

Abstract of Japanese Patent No. 059303/75 from Patent Index of Derwent Publishing.

*Primary Examiner*—Michael R. Lusignan
*Attorney, Agent, or Firm*—Spencer & Frank

[57] ABSTRACT

Solid particles of metal peroxide are coated by means of a coating agent containing a water-soluble condensed phospahte.

8 Claims, No Drawings

SOLID PARTICLES CONTAINING METAL PEROXIDES, THEIR PREPARATION AND THEIR USE FOR THE AMENDMENT OF SOILS

BACKGROUND OF THE INVENTION

The invention relates to solid particles containing metal peroxides and more particularly alkaline earth metal peroxides. It also relates to a process for their preparation and a process for their use for the amendment of soils, especially in agriculture, in horticulture and in sylviculture.

Metal peroxides, such as alkaline earth metal peroxides, constitute very valuable sources of oxygen for various uses. Thus, it is known to amend soils by incorporating solid particles of calcium peroxide therein, from the purpose of obtaining a slow release of oxygen. The oxygen is absorbed by the roots of the plants and promotes their growth (Japanese Patent Application 51/141,265 filed on May 20, 1975 in the name of Nippon Peroxide K.K.).

This slow and continuous supply of oxygen is particularly desirable for crops grown under anaerobic conditions. This is the case when the soils are insufficiently aerated because they are impregnated or filled with water, or even completely flooded, or alternatively because the outer layer has a reduced porosity, for example because of the settling of the earth. This is also the case with soils which contain a large proportion of constituents with a high biochemical oxygen demand (BOD). These constituents can result from the decomposition of organic substances, for example following the use of herbicides, or alternatively from the decomposition of refuse from earlier harvests on unploughed earth.

When they are in the form of anhydrous solid particles, alkaline earth metal peroxides, and more particularly calcium peroxide, decompose only very slightly. On the other hand, in the presence of moisture, calcium peroxide decomposes rapidly, releasing its active oxygen. This decomposition is accelerated if the medium is acid, as can arise naturally in soils or as can result from the presence of certain additives normally used in agriculture, horticulture or sylviculture, such as certain fertilizers. Under these conditions, peroxides in the form of particles do not decompose sufficiently slowly to ensure a continuous supply of oxygen, from the period of germination of the seeds to the period of growth of the plant, or sufficiently completely to allow the utilisation of all the oxygen which is available in principle.

To reduce the rate of decomposition of calcium peroxide when it is used for the treatment of water, it has been proposed to coat it by means of water-insoluble coating agents (European Patent Application 78/200,306 filed on Nov. 15, 1978 in the name of Interox). However, some of these insoluble coating agents form a protective layer which is so effective that it is difficult to recover all the oxygen which is available in principle.

SUMMARY OF THE INVENTION

The object of the present invention is to solve the problem of providing solid particles containing a metal peroxide, such as calcium peroxide, which are suitable as a source of oxygen with slow and continuous release, in particular in media such as moist and possibly acid soils. The particles according to the invention decompose slowly, releasing their active oxygen uniformly, until virtually all the oxygen which is available in principle has been given off. Furthermore, they do not contain non-biodegradable products. Moreover, they have a rate of dissolution in water and a physical stability which are such that, when they are in the presence of water or moisture, the accessibility of the water to the peroxide compound itself is controlled, without being stopped or too greatly inhibited.

Thus, when the particles according to the invention are used for amending crop soils, they release oxygen in a sufficient amount and for a sufficient period to cover the oxygen requirements from the period of germination of the seeds up to the period of development of the roots, without this release of oxygen extending substantially beyond the period during which it is useful.

The present invention relates to solid particles containing a metal peroxide, which are coated by means of a coating agent containing a water-soluble condensed phosphate.

DETAILED DESCRIPTION OF THE INVENTION

In the particles according to the invention, the coating agent can constitute a layer, preferably a continuous layer, arranged around the particle, the core of which consists essentially of metal peroxide. It can also serve as a binder for agglomerating individual fine particles. In this case, each of the individual fine particles of metal peroxide is surrounded by a continuous or discontinuous layer of coating agent.

The term "condensed phosphates" is understood as denoting all phosphates having at least one sequence of phosphorus-oxygen-phosphorus linkages in their molecule. Examples of such phosphates which may be mentioned are pyrophosphates, polyphosphates, such as tripolyphosphates, tetrapolyphosphates and pentapolyphosphates, and metaphosphates, such as trimetaphosphate, tetrametaphosphate and hexametaphosphate.

The term "water-soluble condensed phosphates" is understood as denoting condensed phosphates of which the solubility in water is greater than 1% by weight under normal temperature and pressure conditions.

Pyrophosphates correspond to the general formula:

$$(Me)_n(H)_m P_2O_7$$

in which n is an integer ranging from 1 to 4 and m has the value 4-n, and in which Me represents a metal atom of valency 1 or a group $-NH_4$.

Polyphosphates correspond to the general formula:

$$Me_2O(PO_3Me)_p$$

in which p has a value of at least 3 and in which Me has the same meaning as above.

Metaphosphates correspond to the general formula:

$$(MePO_3)_q$$

in which q has a value of at least 3 and in which Me has the meaning given above.

The condensed phosphates present in the coating agent are generally alkali metal or ammonium phosphates and preferably sodium phosphates. The coating agent can also contain mixtures of phosphates.

Amongst all the phosphates which can be used, polyphosphates and metaphosphates are preferred.

Good results have been obtained with sodium tripolyphosphate and more particularly sodium hexametaphosphate.

The coating agent is generally present in an amount of at least 0.1% and preferably of at least 0.5% of the weight of the particles according to the invention. The amount of coating agent does not generally exceed 40% and preferably 20% of the weight of the particles.

The coating agent generally consists of 30 to 100% by weight of the soluble condensed phosphates, it being possible for any remainder (from 0 to 70%) to consist of various additives depending, inter alia, on the use for which the particles are intended. Thus, the coating agent can contain additives making it possible to reduce attrition, or pH regulators. Suitable pH regulators are buffers, such as carbonates, bicarbonates, sodium tetraborate, by itself or mixed with compounds such as sodium hydroxide, mixtures of sodium hydrogen phosphates or potassium hydrogen phosphates, and the like. The pH regulators are generally present in amounts of at most 70% and preferably of 10 to 60% of the total weight of the coating agent. The other additives in the coating agent are generally present in amounts of at most 10% of its weight.

Preferably, the coating agent contains from 40 to 90% of its weight of soluble condensed phosphates, from 10 to 60% of pH regulators and up to 10% of other additives.

The metal peroxides contained in the particles according to the invention can be of diverse types. In general, they are peroxides of metals from groups 1 and 2 of the periodic table of the elements. They can also be mixtures of peroxides. Preferably, they are peroxides of metals from group 2, such as calcium peroxide, magnesium peroxide and zinc peroxide. Good results have been obtained in the case of calcium peroxide.

The particles according to the invention can contain, mixed with the metal peroxide, various additives in small amounts which do not generally exceed 20% of the total weight of the particles. These additives include, in particular, stabilisers for the peroxides.

The particles according to the invention can also contain variable amounts, which do not generally exceed 40% of the total weight of the particles, of products resulting from the manufacture of the metal peroxide, such as unconverted reactants or reaction by-products (metal oxides, hydroxides and carbonates and the like). Finally, the particles according to the invention can also contain fillers, such as talc, in variable amounts which do not generally exceed 40% of their total weight. These fillers make it possible to adjust the active oxygen content of the desired value.

Particles according to the invention thus contain, in proportions by weight:
 from 10 to 95% of metal peroxides;
 from 0.1 to 20% of a coating agent containing from 30 to 100% of its weight of soluble condensed phosphates, up to 70% of pH regulators and up to 10% of other additives;
 up to 20% of additives such as stabilisers;
 up to 40% of products resulting from the manufacture of the metal peroxides; and
 up to 40% of fillers.

The particles according to the invention can contain variable amounts of active oxygen. In general, they contain at least 1% of their weight of active oxygen. Most frequently, this proportion does not exceed 40%. In the case of calcium peroxide, the particles according to the invention generally contain from 8 to 20% by weight of active oxygen.

The particles according to the invention can have very variable dimensions. Their diameter is generally more than 0.01 mm. Most frequently, it is from 0.01 to 50 mm and preferably from 0.1 to 25 mm.

As stated previously, the particles can be presented in the form of granules, the outer layer of which contains the coating agent, or in the form of agglomerates of individual fine particles bound to one another by the coating agent. These agglomerates can have any shape, such as that of pellets, lozenges or tablets.

If the particles according to the invention are presented in the form of agglomerates, they can be manufactured by dry-mixing fine particles of metal peroxide and of coating agent in the desired proportions. The dry-mixing can be carried out in any known mixer and is followed by compaction, which is intended to agglomerate the fine particles to one another in order to form the particles according to the invention. Any known compacter capable of exerting a sufficient pressure can be used for this purpose. Preferably, the pressure exerted during the compaction is greater than 50 kg/cm$^2$. Suitable apparatuses are pelletisers and roller compacters. After compaction, it is also possible to grind the particles in order to bring them to the dimensions desired for their use.

Another technique consists in agglomerating the fine particles of metal peroxide by means of a solution or a suspension of the coating agent in an appropriate solvent. This treatment can be carried out in various types of apparatuses which are in themselves known, such as fluidised-bed dryers or drum dryers.

The fine particles used in the agglomeration processes generally have an average diameter of 0.1 to 300 microns and more frequently of 1 to 100 microns.

According to a preferred embodiment of the invention, the particles are presented in the form of granules, the outer layer of which contains the coating agent. The present invention also relates to a process for the manufacture of the particles of this type.

The process consists in spraying a solution of the coating agent in a liquid medium onto moving particles of metal peroxide, and in evaporating the solvent from the solution.

The coating agent is generally used in the form of an aqueous solution.

The concentration of the coating agent in the solution can vary within fairly wide limits and is generally from 1 to 70% of the total weight of the solution. The concentration used is preferably as close as possible to the concentration at which separation of a solid phase is observed under the temperature conditions used.

The solution is generally used at a temperature ranging from ambient temperature to a temperature slightly higher than that of the granules onto which it is sprayed. In general, the temperature of the solution ranges from ambient temperature to the temperature of the granules onto which it is sprayed, plus 25° C.

The temperatures at which the spraying and the evaporation are carried out are lower than the decomposition temperature of the coating agent and do not generally exceed 120° C. Temperatures from 25° to 110° C. are generally used for the evaporation.

The spraying can be carried out in accordance with various techniques, for example in a fluidised bed, on a rotating floor, in a rotary drum or in any other analogous device which is in itself known.

The evaporation can be carried out at the same time and in the same enclosure as the spraying, or in a different apparatus. It is generally carried out in accordance with a continuous process. A device such as a fluidised bed, or any other device which is in itself known, is suitable. In this case, the temperature of the fluidised bed is generally from 30° to 105° C.

The use of a fluidised bed has proved particularly advantageous, on the one hand because the spraying and the evaporation can be carried out simultaneously in the same apparatus, and on the other hand because this technique makes it possible to obtain a more compact and more homogeneous coating.

Any inert gas, and in particular air, can be used as the fluidising gas. This gas can be heated in order to keep the temperature of the fluidised bed at the desired value. It is also possible to use other heating means, such as a nest of tubes placed in the fluidised bed.

It is also possible to use a process which is similar but discontinuous.

The present invention also relates to the use of the particles according to the invention as a source of oxygen for the amendment of soils, in particular in agriculture, in horticulture and in sylviculture.

Thus, the particles according to the invention can advantageously be used for the amendment of very moist soils. They can also be used if the coated seeds containing a source of oxygen in their coating are not appropriate, either for physical reasons, as is the case in the plant of saplings, vine stocks and the like, or for chemical reasons, as is the case if the seeds are particularly sensitive to inorganic salts.

When the particles according to the invention are used for the amendment of soils, they are generally incorporated by burying them at a depth of 1 to 5 cm. The particles are generally used at a rate of 1 to 1,000 g/m$^2$ of area treated.

The examples below serve to provide a better understanding of the invention and to show the noteworthy results obtained when using the coating agents according to the invention, without however limiting the scope of the invention to the embodiments described.

Example 1 gives a method for the preparation of the particles containing coated calcium peroxide.

Examples 2 to 9 demonstrate the reduction in the rate of decomposition of the calcium peroxide contained in the particles according to the invention.

Examples 5 to 7 and 9 are given by way of comparison.

EXAMPLE 1

Manufacture of calcium peroxide particles agglomerated by means of sodium hexametaphosphate (HMP)

A powder of calcium peroxide (containing 80% of $CaO_2$) obtained by reacting hydrogen peroxide with lime is used. The average particle diameter is 8 microns.

The powder is agglomerated by a continuous process in a fluidised bed.

The apparatus used consists of a roller of diameter 15 cm and height 77 cm, equipped at its base with a gas-distributing plate (2 mm holes).

Initially, 3.5 kg of calcium peroxide particles having a diameter of less than 2 mm are introduced.

Air is passed through the gas-distributing plate, and an aqueous solution, containing 3% by weight of sodium hexametaphosphate, 2.5% by weight of sodium carbonate (buffer) and 0.32% by weight of 100% strength hydrogen peroxide, is introduced, at a rate of 2.7 kg per hour, by means of a pneumatic sprayer (atomiser) located in the wall, 11 cm from the bottom. The temperature of the solution is 20° to 25° C.

Simultaneously, the calcium peroxide powder is introduced into the fluidised bed at a rate of 2.7 kg per hour, via a vibrating chute, with the aid of a venturi tube supplied with compressed air.

The height of the bed is 25 cm and its temperature is 32° C.

Agglomerated particles, having sizes of between 0.5 and 4 mm and containing about 65% by weight of calcium peroxide, are drawn off from the apparatus as the overflow.

EXAMPLES 2 TO 7

Rate of decomposition in the soil of the calcium peroxide of the particles

Two series of experiments were carried out with, respectively, calcium peroxide particles obtained in accordance with the process of Example 1 (Examples 2 to 4) and uncoated calcium peroxide particles (Comparison Examples 5 to 7).

10 parts by weight of calcium peroxide particles are mixed with 90 parts by weight of moist JOHN INNES No. 1 potting compost (containing 15.6% of water).

The mixtures are placed in sealed glass bottles and kept overnight.

The loss of oxygen of the calcium peroxide particles is measured and is given in Table 1 below.

TABLE 1

| | Particles | | | Rate of decomposition Loss of oxygen per second and | |
|---|---|---|---|---|---|
| Example No. | $CaO_2$ % by weight | $Na_2CO_3$ % by weight | HMP % by weight | per g of mixture $1 \cdot sec^{-1} \cdot g^{-1}$ | per g of 100% $CaO_2$ (average) |
| 2 | 65 | 1.9 | 2.9 | $2.37 \cdot 10^{-9}$ | $1.2 \cdot 10^{-10}$ |
| 3 | 65 | 1.9 | 2.9 | $1.82 \cdot 10^{-9}$ | |
| 4 | 65 | 1.9 | 2.9 | $1.51 \cdot 10^{-9}$ | |
| 5 | 80 | — | — | $4.92 \cdot 10^{-9}$ | $3.8 \cdot 10^{-10}$ |
| 6 | 80 | — | — | $4.65 \cdot 10^{-9}$ | |
| 7 | 80 | — | — | $4.84 \cdot 10^{-9}$ | |

EXAMPLES 8 AND 9

Rate of hydrolysis of the calcium peroxide of the particles in an aqueous medium Doses corresponding to 500 mg/l of calcium peroxide particles obtained in accordance with Example 1 (Example 8) and of uncoated calcium peroxide particles (Example 9) were placed in two containers kept under static conditions at ambient temperature and containing demineralised water.

After 25 days, the loss of active oxygen of the particles was measured. The loss of active oxygen per day is given in Table 2 below.

TABLE 2

| Example No. | Particles | Rate of decomposition % per day |
|---|---|---|
| 8 | Particles of Example 1 | 2.1 |
| 9 | $CaO_2$ particles containing | 2.7 |

TABLE 2-continued

| Example No. | Particles | Rate of decomposition % per day |
|---|---|---|
| | 80% by weight of CaO$_2$ | |

What is claimed is:

1. Solid particles containing a metal peroxide, coated by means of a coating agent, for use for the amendment of soils, wherein the coating agent contains 30 to 100% by weight water-soluble condensed phosphate and is present in an amount of 0.1 to 40% of the weight of the particles, and the metal peroxide is a peroxide of a metal from group 2 of the periodic table of the elements.

2. Particles according to claim 1, wherein the coating agent contains, as the condensed phosphate, an alkali metal polyphosphate or metaphosphate or an ammonium polyphosphate or metaphosphate.

3. Particles according to claim 2, wherein the coating agent contains, as the condensed phosphate, sodium tripolyphosphate.

4. Particles according to claim 2, wherein the coating agent contains, as the condensed phosphate, sodium hexametaphosphate.

5. Particles according to claim 1, wherein the coating agent also contains a pH regulator.

6. Particles according to claim 1, wherein the metal peroxide is calcium peroxide.

7. Process for the preparation of particles according to claim 1, wherein a solution of the coating agent is sprayed onto moving particles of metal peroxide, and the solvent is evaporated from the solution.

8. Process for the amendment of soils, wherein particles according to claim 1 are incorporated therein.

* * * * *